Oct. 11, 1955     F. H. CALDWELL     2,720,014
SAFETY SNAP FASTENER FOR FISHING TACKLE
Filed April 21, 1952
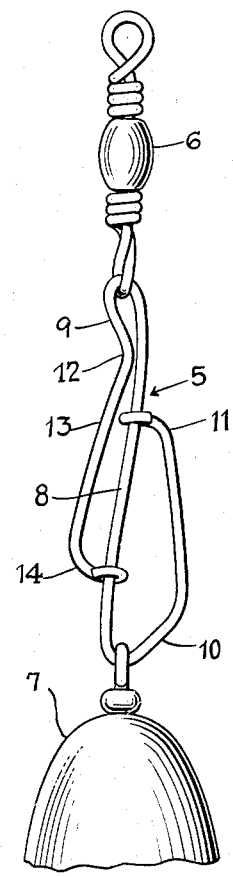
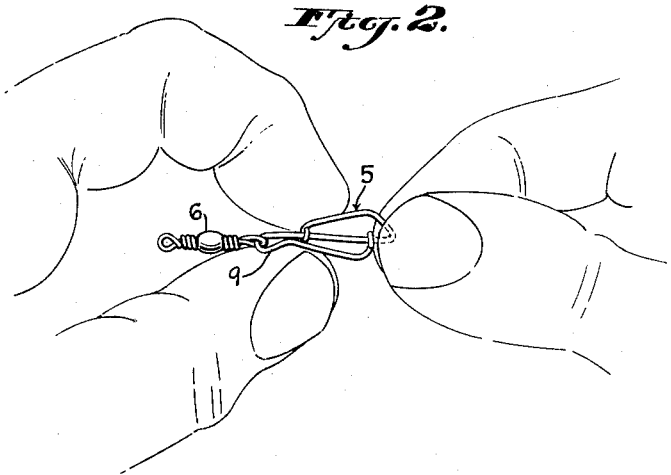
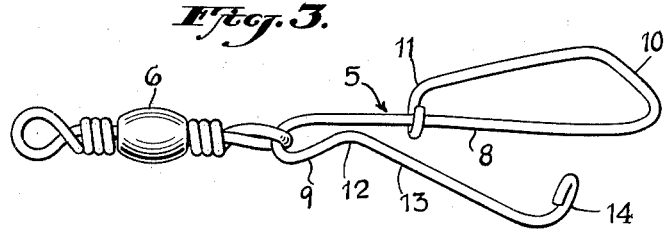
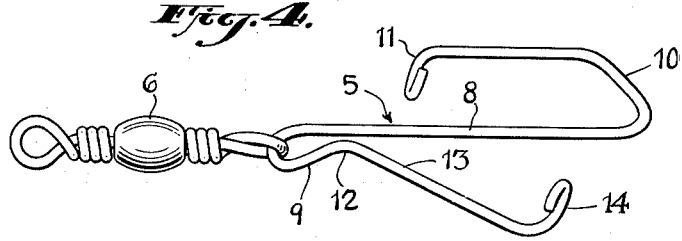
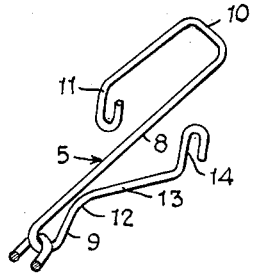
INVENTOR.
FERRIS H. CALDWELL.
BY
Ward, Crosby & Neal
ATTORNEYS

United States Patent Office 2,720,014
Patented Oct. 11, 1955

---

2,720,014

SAFETY SNAP FASTENER FOR FISHING TACKLE

Ferris H. Caldwell, Canton, N. Y.

Application April 21, 1952, Serial No. 283,404

1 Claim. (Cl. 24—73)

---

This invention relates to improved safety snap fasteners for fishing tackle.

Usually, devices for this purpose have been formed of wire shaped to various configurations and soldered or otherwise secured to sheet metal portions which serve to complete the assembly. While a large variety of types of devices for this purpose have been used or proposed, they are subject to various shortcomings, either as to strength, durability, liability to cause tangling of the tackle, excessive expense and, what is most serious, the liability of becoming unhooked or detached when subjected to heavy or irregular strains.

With the present invention these difficulties are overcome by a simple inexpensive form of device, so made from a single piece of wire that the catch parts are safely and effectively locked against disengagement even when the tackle is dragged over obstructions or is being irregularly threshed about during the landing of usually active or heavy fish.

Various further and more specific objects, features and advantages of the invention will appear from the description given below taken in connection with the accompanying drawings illustrating, by way of example, the preferred form of the invention. The invention consists in such novel features and combinations as may be shown and described in connection with the example of the invention herein disclosed.

In the drawings:

Fig. 1 is an elevational view showing a preferred form of the invention;

Fig. 2 is a view showing the manner in which the device may be easily gripped by the fingers for disengaging the catch portions;

Fig. 3 is a view showing the device with the safety catch open;

Fig. 4 is a view of the same device showing both the safety catch and the connecting loop portions in open condition; and Fig. 5 is a view similar to Fig. 4 taken at a somewhat different angle.

Referring to Fig. 1 in further detail, the safety snap fastener device constituting the invention in its preferred form is shown at 5, connected at one end to a swivel assembly 6 and at the other end to a fishing plug or other form of lure 7.

The device 5, it will be noted, is formed of a single piece or length of wire having a central portion 8 which is straight or substantially straight, and extends from end to end of the device. The upper end of this central portion is bent around and down as at 9 at one side of the central portion to form an eylet-like configuration into which, for example, the swivel assembly 6 may be permanently connected. The wire at the other end of the device is bent around and upwardly as at 10 to form a relatively large loop into which the lure or the like at 7 may be connected. The loop portion 10 terminates at its upper end as a hook formation 11, normally engaging the central portion of the wire just below the eyelet formation.

The portion 9 forming the eyelet, as will be noted, is bent back into contact or substantially into contact as at 12, with the central portion, and then continues on as at 13 past the hook 11, and then further along the central portion to terminate in a second hook 14 engaging the central portion near its end opposite from the eyelet.

High tensile strength springy steel wire is preferably used, and the loop 10 is so formed as to be biased toward open position and to spring to open position as shown in Fig. 4, except when its hook at 11 engages the central portion. The other end portion which terminates in the second hook 14, is also so formed as to be biased toward open position, as shown in Fig. 3, but when the hook 14 is engaged, this biased portion will be in a position at 13 to retain the hook at 11 against disengagement. If desired, the hook at 11 may act as a sort of fulcrum for the portion carrying the hook 14, so that in this way hook 11 may act to cause tension on hook 14 tending to firmly retain same in its engaging position. However, it is not essential that hook 11 be normally in contact with the wire portion at 13 so long as the latter is positioned close enough to hook 11 to prevent same from being disengaged.

In order to disengage the hook portions, the parts of loop 10 may be held between one thumb and forefinger, as shown in Fig. 2, while the other thumb is being used, as shown, to first disengage the hook 14, allowing same to spring out to the position shown in Fig. 3. Then the hook 11 is free to be disengaged and will spring out to the position shown at Fig. 4, enabling a lure or the like, to be easily connected to or to be removed from the loop 10.

Since the central portion 8 extends substantially along a straight line from substantially one end of the device to the other, this portion may be subjected to very heavy loads under tension without being subject to distortion, and without tending to disengage the hook portions which are conveniently located for easy manipulation along opposite sides of the central portion.

It will be noted that the loop 10 being biased toward open position, its hook 11 normally tends to bend the central portion slightly to the right, as viewed in Fig. 1, thus tending to prevent this portion from being dislodged from the hook 14 which pulls to the left. Thus the hooks tend mutually to interact, one to prevent the other from disengagement. At the same time the portion at 13 as retained by the hook 14 against outward movement serves positively to lock the hook 11 against disengagement, unless and until the hook 14 is manually released. Since the eyelet portion 9 is relatively small and abruptly bent, heavy loads will not tend to pull the portions 12, 13 and 14 out of place. Also, any unintended disengagement of hook 14 is strongly resisted by reason of the fact that the portion at 13 will engage the hook 11 firmly whenever any force is applied tending to disengage hook 14.

Thus, a single piece of wire which may be conveniently shaped as shown on automatic machinery, provides an extremely inexpensive form of construction, the various parts of which interact effectively and safely to insure that the device will not fail when subjected to highly irregular and powerful forces in use.

Tests have proven that the fastener will remain closed upon application thereto of forces several times greater than would normally be experienced in actual use.

What is claimed as new and desired to be secured by Letters Patent of the United States, is:

A safety snap fastener for fishing tackle comprising a single piece of spring wire, the central portion of which extends in generally straight condition from end to end of the device, one end portion being bent around and to one side of said central portion and back to form a relatively small substantially closed eyelet configuration at one end of the central portion, the other end portion of the wire being bent around and to the other side of said central portion to form a relatively large loop, which is resiliently biased to expand, but which terminates as a hook normally detachably engaging said central portion near the eyelet, said first-named end portion continuing from the eyelet back along the central portion and adjacent said hook and forming a safety catch terminating in a second hook detachably engaging said central portion near its end opposite from the eyelet, such safety catch portion being positioned to normally retain said first-named hook against the central portion and thereby against disengagement, and also being biased to spring away from the central portion when unhooked, to allow said first-named hook to be disengaged.

References Cited in the file of this patent

UNITED STATES PATENTS

| | | |
|---|---|---|
| 1,440,628 | Raub | Jan. 2, 1923 |
| 1,728,560 | Goshorn | Sept. 17, 1929 |
| 2,050,757 | Leon | Aug. 11, 1936 |
| 2,206,274 | Wiberg | July 2, 1940 |

FOREIGN PATENTS

| | | |
|---|---|---|
| 922,764 | France | Feb. 10, 1947 |